United States Patent [19]

Schroeder et al.

[11] Patent Number: 4,926,122
[45] Date of Patent: May 15, 1990

[54] HIGH SENSITIVITY MAGNETIC CIRCUIT

[75] Inventors: Thaddeus Schroeder, Rochester Hills; Bruno P. B. Lequesne, Royal Oak, both of Mich.

[73] Assignee: General Motors Corporation, Detroit, Mich.

[21] Appl. No.: 229,396

[22] Filed: Aug. 8, 1988

[51] Int. Cl.$^5$ .......................... G01B 7/14; H01L 43/00
[52] U.S. Cl. ........................... 324/207.13; 338/32 R; 324/207.22
[58] Field of Search ............... 324/207, 208, 174, 175, 324/173; 338/32 R, 32 H

[56] References Cited

U.S. PATENT DOCUMENTS 4,612,502  9/1986  Spies ..................................... 324/208
4,733,177  3/1988  Pawletko ............................. 324/207

OTHER PUBLICATIONS

O. S. Lutes et al, "Sensitivity Limits on SOS Magnetodiodes", *IEEE Transactions on Electron Devices*, vol. ED-27, No. 11, pp. 2156–2157 (Nov. 1980).

M. Kimura and S. Takahashi, "Si Magnetic Sensor Composed of Two Combined PIN Diodes," *Electronics Letters*, vol 22, No. 16, pp. 830–832 (Jul. 31, 1986).

A. Chovet et al, "Noise Limitations of Magnetodiodes," *Sensors and Actuators*, 4 (1983), pp. 147–153, based on a paper presented at Solid-State Transducers 83, Delft, the Netherlands, May–Jun. 3, 1983.

S. Kataoka, "Recent Development of Magnetoresistive Devices and Applications," *Circulars of the Electrotechnical Laboratory*, No. 182, UDC 621,382:537.621.2, pp. 1–52, Agency of Industrial Science and Technology, 2-Chome Nagata-Cho, Chiyoda-Ku, Tokyo, Japan (Dec. 1974).

S. Kordic, "Integrated Silicon Magnetic-Field Sensors", *Sensors and Actuators*, vX, n3–4 pp. 347–378, (Nov./Dec. 1986).

T. Yamada, "A New Highly Sensitive Magnetoresistive Effect in Semiconductors", *Proceedings of the IX International Conference on the Physics of Semiconductors*, vol. 2, Moscow, Jul. 23–29, 1968, pp. 673–675.

G. H. Dohler, "Physics and Applications of Doping Superlattices", a paper from pp. 270–284 of the book *Two-Dimensional Systems, Physics and New Devices; Proceedings of the International Winterschool, Mauternsdorf Austria*, 1986, published by Springer Verlag, Berlin 1986.

G. H. Dohler, "n–i–p–i Doping Super lattices, Metastable Semiconductors with Tunable Properties", *Journal of Vacuum Science and Technology*, B, vol. I, No. II, Apr.–Jun. 1983, pp. 278–284.

Primary Examiner—Reinhard J. Eisenzopf
Assistant Examiner—Walter E. Snow
Attorney, Agent, or Firm—Robert J. Wallace

[57] ABSTRACT

For increased sensitivity a position sensor includes a magnetic circuit in which the stationary portion includes a permanent magnet whose width is optimally 1.5 times the tooth pitch of the exciter portion of the sensor and the magnet face proximate the exciter includes a thin layer of ferromagnetic material over which is centered a narrow magnetic sensing element, such as a magnetoresistor. The sensing element has a width typically less than the tooth width which is between 0.17 and 0.37 the tooth pitch. The needed flux density is typically available simply by appropriate magnet thickness or choice of magnet material without the need of a flux guide.

18 Claims, 3 Drawing Sheets

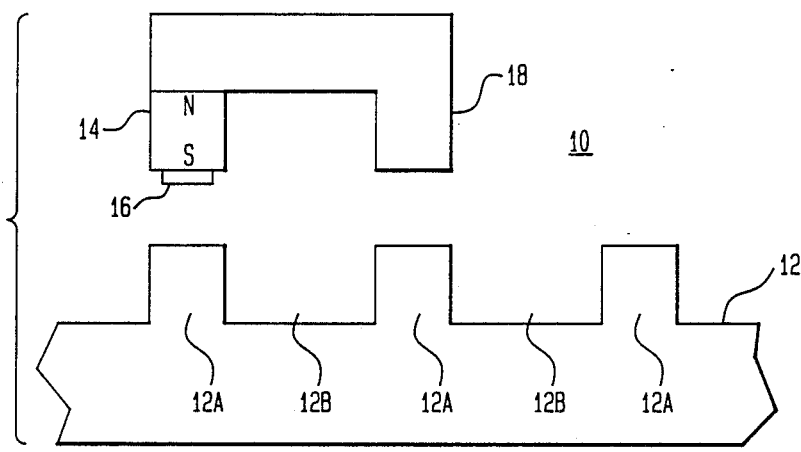
FIG. 1
(PRIOR ART)
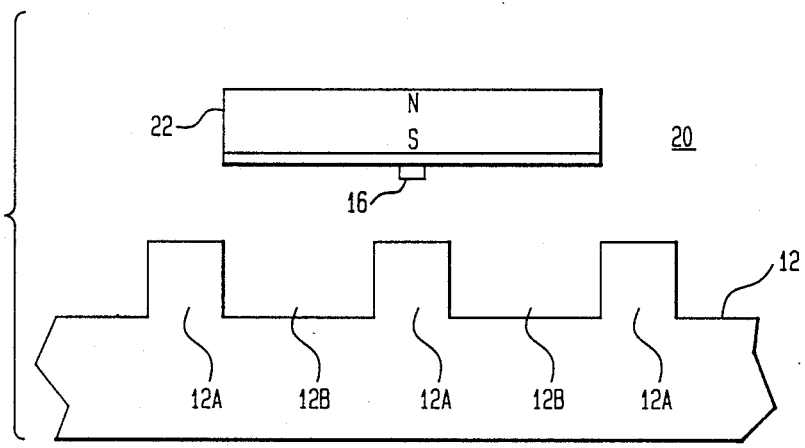
FIG. 2
FIG. 3
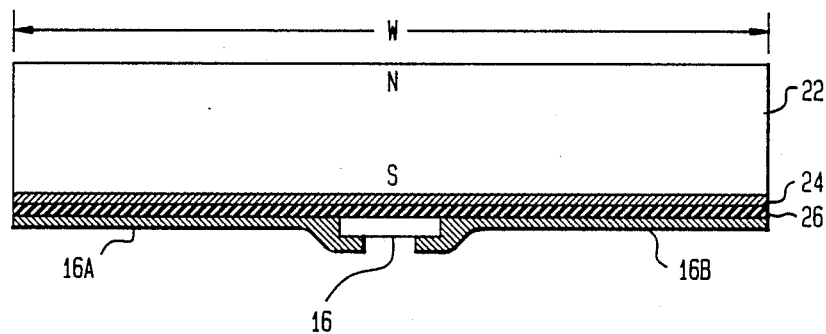

HIGH SENSITIVITY MAGNETIC CIRCUIT

FIELD OF THE INVENTION

This invention relates to a position sensor, and more particularly to a sensor based on sensing changes in magnetic flux passing through a magnetic flux sensitive element.

BACKGROUND OF THE INVENTION

The need for sensing position, speed or acceleration is growing, particularly in the automotive field. Anti-lock braking systems, traction control systems, electric power steering, four-wheel steering and throttle control are examples of functions that can use such sensing.

For such applications, it is desirable to have a position sensor (speed and acceleration can be derived from a position signal) that is rugged and reliable, small and inexpensive, capable of low (including zero) speed sensing and relatively immune to electromagnetic field interference from the other systems used in an automobile.

A well known form of position sensor is a semiconductor magnetoresistive sensor. Such a sensor comprises a magnetic circuit that includes two basic parts. One of these parts, typically kept stationary, includes a semiconductive sensing element that is sensitive to the magnetic flux density passing through its surface, and further includes a permanent magnet for creating a reference flux. The other of the two parts, termed the exciter, includes a high magnetic permeability element with a series of teeth that moves with relation to the stationary element for changing the reluctance of the magnetic circuit and for causing the magnetic flux through the sensing element to vary in a fashion corresponding to the position of the teeth.

Such a sensor is sensitive to the magnetic flux density rather than to the rate of flux density change and so it does not have a lower speed limit. This also makes it less sensitive to E.M.I. Moreover, its response is predictably related to the distribution of flux density over the surface of the sensing element.

Typically, the stationary part includes a magnetoresistive element including a semiconductive element whose resistance varies with the magnetic flux density passing through it in controllable fashion so that an electrical output signal can be derived. Moreover, when this magnetoresistor is produced from a high electron mobility semiconductor, such as compound semiconductors like indium antimonide or indium arsenide, a large electrical output signal can be available. If the output signal is sufficiently large, there is the possibility of providing an output signal that requires little or no further amplification, a factor of considerable advantage.

It is desirable to have a position sensor of high sensitivity so that a large electrical output signal can be produced efficiently and of easy manufacture so that it can be made reliably and at low cost.

The magnitude of the flux variations in the sensing element for a given change in position of the exciter is an important factor in determining the sensitivity of the sensor. Accordingly, a variety of designs have been attempted hitherto to maximize the change in the flux density through the sensor in response to a given change in exciter position. Typically, these attempts involved including a flux guide for the permanent magnet included in the stationary part of the magnetic circuit to provide a return path for the magnetic field of the magnet. Additionally, sometimes a field concentrator of commensurate size has been provided contiguous to the magnetoresistive element to concentrate flux through the magnetoresistive element.

However, for example, such techniques have typically produced magnetic circuit sensitivities no higher than about five percent for a typical exciter design having a three millimeter tooth pitch and one millimeter gap, where the sensitivity is defined as the difference between the maximum and minimum flux densities sensed divided by the mean flux density sensed (half the sum of the maximum and minimum flux densities sensed).

SUMMARY OF THE INVENTION

The present invention is a novel magnetic circuit for use in a position sensor. It features a simple and planar geometry that makes it amenable for batch processing with a consequent saving in manufacturing cost. Moreover, it makes possible attainment of sensitivities appreciably higher than prior art structures.

In particular, the novel magnetic circuit employs a stationary part that comprises a permanent magnet whose width is several times wider than that of the magnetic sensing element and, advantageously, at least about one and one half times the pitch of the exciter teeth. Moreover, in the preferred embodiment for further improvement in the sensitivity, the surface of the magnet adjacent to which the teeth pass is provided with a thin layer of a magnetic material of high permeability and the magnetic sensing element advantageously is centered on this magnetic layer. Additionally, the width of the magnetic sensing element is desirably narrow for maximum sensitivity, but is wide enough to have a suitable resistance for good impedance matching with the electrical circuit used to detect the change in properties resulting from the magnetic flux being sensed. Preferably any flux guide or field concentrator is avoided by using a magnet of adequate strength.

It is characteristic of this magnetic circuit that the passing teeth of the exciter essentially vary only the spatial distribution of the magnetic flux density along the width of the magnet for creating sharp local flux density variations that can been readily sensed by the sensing element, while the total flux density passing through the thin ferromagnetic layer remains essentially constant. By way of contrast, in prior art magnetic circuits, the passing teeth of the exciter vary the circuit reluctance and consequently vary the total magnetic flux in the circuit.

The invention will be better understood from the following more detailed description taken with the accompanying drawings.

BRIEF DESCRIPTION OF THE DRAWINGS

FIG. 1 shows a typical magnetic circuit of a prior art position sensor of the type using a flux guide return path;

FIG. 2 shows the magnetic circuit of a position sensor in accordance with a preferred embodiment of the present invention;

FIG. 3 shows in more detail the stationary sensing portion of the magnetic circuit shown in FIG. 2;

DETAILED DESCRIPTION

Figure 4A:
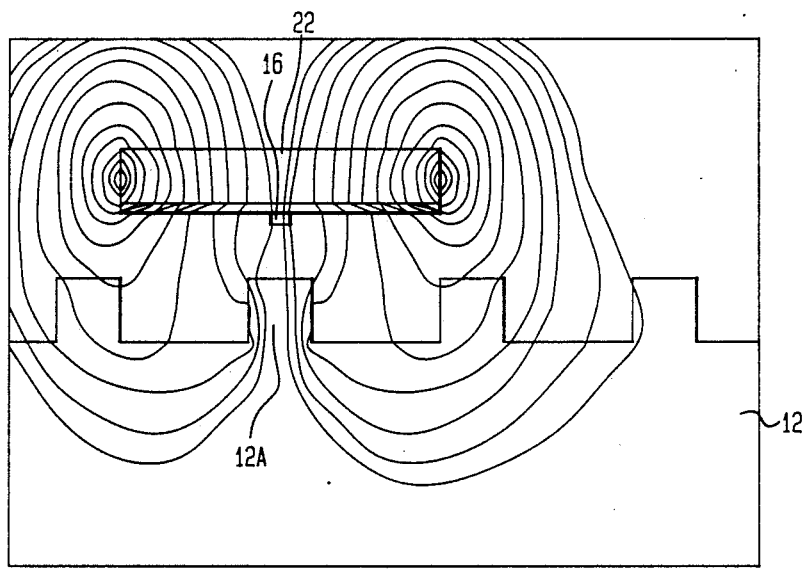
FIGS. 4A and 4B show the magnetic circuit of FIG. 2 for two different positions of its permanent magnet relative to the exciter.

With reference now to the drawings, FIG. 1 shows a typical prior art form of position sensor 10 in which the magnetic circuit comprises an exciter portion 12 of ferromagnetic material made up of a succession of teeth 12A spaced by gaps 12B and a stationary sensing portion comprising the permanent magnet 14 supporting on one surface the sensing element 16 and a flux guide 18 for providing a return path for the magnetic field. As shown, the width of each tooth is about equal to the width of the magnet and of the sensing element. Optionally, a field concentrator (not shown) may be localized over the sensing element 16 in the form of a thin layer of a high permeability ferromagnetic material.

The exciter 12 typically is a plate with spaced teeth along one edge and is adapted to move horizontally so that its teeth pass under the permanent magnet 14 and the sensing element 16 in accordance with the movement of a position that is being sensed. Alternatively, the exciter may be a circular plate, with teeth around its circumference interspersed with slots, that rotates about a fixed center for varying the position of the teeth relative to the sensing element. The exciter is typically of a high permeability ferromagnetic material, such as iron.

The permanent magnet is polarized vertically in the plane of the paper, as indicated. The sensing element typically is a magnetoresistor, a two terminal element whose resistance increases with increasing magnetic flux passing vertically through its bulk and typically had nearly the same width as the magnet. A variety of semiconductive compounds, such as indium antimonide and indium arsenide are known to exhibit strong magnetoresistive effects. Alternatively, the sensing element may be a magnetodiode of the kind in which the magnetic flux is used to deflect charge carriers by Lorentz forces from regions of high carrier lifetimes to regions of low carrier lifetimes for modulating the resistance of the magnetodiode. Additionally, in some instances, the sensing element may be a magnetotransistor to provide gain, although this is a three terminal device that adds complexity.

The flux guide 18 also is advantageously of a high permeability material, such as iron, and its presence can increase the flux density through the sensor by providing an efficient return path for the flux passing through the exciter. To this end, the center-to-center spacing of adjacent teeth of the exciter and the center-to center spacing of the magnetic path formed by the permanent magnet and the flux guide are made essentially equal, as shown. Such a flux guide, however, in fact adds little to the sensitivity and so is unnecessary if adequate flux density is provided, either by a magnet of sufficient thickness or choice of magnet material.

Typical dimensions might be about one millimeter both for the vertical thickness and for the horizontal width of the magnet 14, similarly about one millimeter for the height and width of each tooth 12A, about two millimeters for the width of a gap 12B, and about one millimeter for the separation between tooth and the magnet in the position shown. The flux guide 18 typically would be of the same scale and would add about another millimeter to the height of the magnet path. The lateral dimension of the magnet normal to the plane of the drawing typically is wide enough to keep low any edge effects in the sensing element.

With a magnetic circuit of this kind, the maximum sensitivity that is obtained tends to be less than about five percent. Moreover, sensors are known in which the stationary part of the magnetic circuit includes a pair of magnetic sensing elements for use as separate legs of a differential sensor. In such cases, the two sensing elements typically are so spaced that when one of the sensing elements is positioned directly opposite one tooth, the other sensing element is positioned directly opposite the center of the gap between adjacent teeth to maximize the difference of the outputs from the time sensing element. Such sensors provide higher sensitivities but at the expense of greater complexity.

In FIG. 2, there is shown a position sensor 20 in accordance with a preferred embodiment of the present invention. Its magnetic circuit includes the exciter 12 that may be similar to the exciter included in the position sensor 10 shown in FIG. 1 and so the same reference number is used. The stationary portion of the magnetic circuit is shown in greater detail in FIG. 3. It includes a permanent magnet 22, magnetized vertically as shown, and on its bottom surface there is provided the sensing element 16 that may be similar to sensing element 16 in the position sensor 10 of FIG. 1. In accordance with a feature of the invention, intermediate between the sensing element 16 and the permanent magnet 22 there is included a layer 24 of high permeability magnetic material, such as iron, that covers the entire bottom surface of the permanent magnet 22. Additionally, to ensure that this layer does not electrically short the sensing element 16, there is included an insulating layer 26 intermediate between the sensing element 16 and the layer 24. If the layer 24 were of a non-conducting material, such as high permeability ferrite, the insulating layer 26 would become unnecessary and so might be omitted.

In sensor 20, in accordance with a feature of the invention, for increased sensitivity the width W of the permanent magnet 22 is considerably wider than the typical width of the prior art sensor 10 shown in FIG. 1. Advantageously, the width of the permanent magnet is made to be the sum of the width of one tooth and two gaps of the exciter, as shown, as seen in FIG. 2, and so about one and one half times the pitch of the teeth of the exciter. By way of contrast, in the sensor shown in FIG. 1, the width of the permanent magnet 14 essentially matches that of a tooth 12A of the exciter. Moreover, the improvement in sensitivity provided by this increase in magnet width is further augmented by the presence of the magnetic layer 24.

For maximum magnetic sensitivity, in our design it is another feature that the width of the sensing element is desirably as narrow as is convenient. However, for electrical circuit efficiency, it is desirable that the element have a sufficiently high resistance, for example, at least 100 ohms, which imposes practical limits on how narrow the element may be. Also the sensing element needs to be wide enough to have adequate power dissipation capabilities. Nevertheless, the sensing element typically would be significantly narrower than the tooth element unless the exciter design involved unusually narrow teeth. As shown, the sensing element 16 is provided at opposite ends with electrodes 16A and 16B by means of which it may be connected into an appropriate electrical circuit. These are typically metallic platings deposited on the insulating layer 26. The ferromagnetic layer illustratively can be about 0.1 millimeters thick and of a material such as low carbon steel 1008. The result is a geometry made up of a series of planar layers that is easy to manufacture.

The sensing element 16 typically is chosen in accordance with the particular application intended. A magnetoresistor is preferred for most applications since it is essentially independent both of the direction of the magnetic flux passing therethrough and also of its own shape since its sensitivity depends on the average flux intensity passing therethrough. Where small physical size is of primary importance, a magnetodiode or magnetotransistor may be preferred, although these are typically sensitive to the direction and specific area where the magnetic flux passes through the sensing element.

Figure 4B:
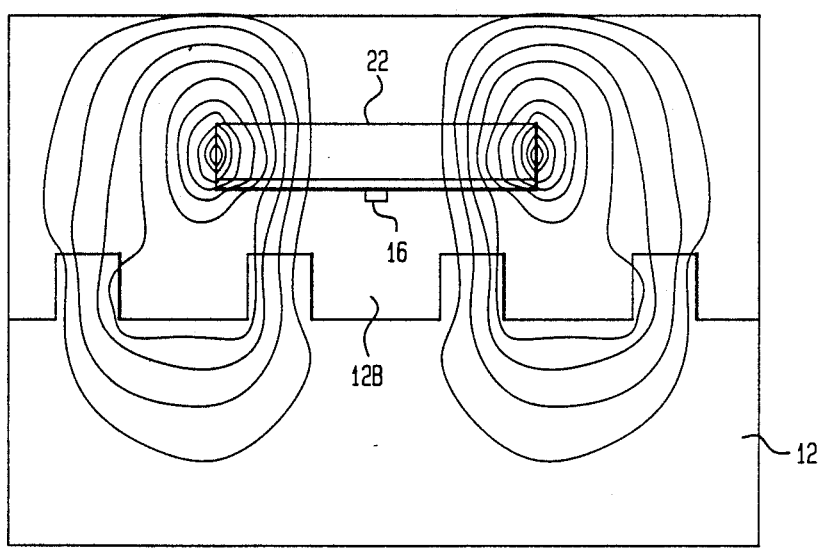

FIGS. 4A and 4B illustrate the conditions for maximum and minimum flux through the sensing element 16 respectively for the position sensor 20 shown in FIG. 2. As seen in FIG. 4A, when the sensing element 16 is directly opposite a tooth 12A of the exciter, the flux density represented by lines 30 through sensing element 16 is comparatively high. However, when the exciter has moved so that the sensing element 16 is opposite the center of a gap 12B between teeth, the flux density through the sensing element 16 is comparatively less. Typically, the maximum flux density may be 0.2 Tesla and the minimum flux 0.15 Tesla for a 2 millimeter thick MQ2 magnet. MQ2 magnet material is an NdFeB alloy that has an energy product between 13-15 MGOe, is isotropic and 100 percent dense and is a trademarked product of General Motors Corporation.

The role of the ferromagnetic layer 24 makes it easier for the flux to travel towards or away from the sensing element 16, thus increasing the maximum flux and decreasing the minimum flux that passes through the sensing element, and thereby increasing the sensitivity, which is dependent on the difference between the maximum and minimum fluxes sensed.

In particular, the movement of the exciter teeth little affects the total flux density but does vary the spatial distribution of the flux density along the width of the magnet, creating sharp local flux density variations that can be sensed by a localized sensing element, such as a magnetoresistor. The ferromagnetic layer permits the flux density to be distributed along the magnet width in a way that reflects the profile of the air gap between the stationary portion of the magnetic circuit and the exciter. Where this air gap is narrow, the flux density is high, where this gap is wide, the flux density is low. Since this air "gap" is narrowest alongside a tooth of the exciter, the flux density there will be highest and this density peak will follow the tooth movement along the width of the magnet. In particular, our tests have shown that the addition of the thin ferromagnetic layer 24 in the manner described can essentially double the sensitivity of a sensor with an already optimum width magnet. The optimum thickness of the ferromagnetic layer is determined by the maximum flux density it is desired to guide without saturation. Layers even as thin as five microns have proven to be useful for a sensed maximum flux density of about 0.12T. For this flux density improvement tends to level off when the thickness reaches about 25 microns.

The magnetic layer 24 can be provided simply as a thin metallic foil attached to the surface of the permanent magnet 22 using conventional adhesives. Alternatively, magnets manufactured by compressing and/or sintering magnetic powder, can produce a ferromagnetic layer as an integral part of the permanent magnet.

To this end there is introduced into the die cavity an appropriate amount of iron powder, before or after the magnetic powder is introduced, and then the powders are compressed together. Moreover, the planar geometry makes feasible batch-processing whereby hundreds of magnetoresistors may be deposited simultaneously on a relatively thin unmagnetized permanent magnet wafer having a ferromagnetic layer and an insulating layer. The wafer would then be cut into separate sensors, the sensors packaged, and the permanent magnets magnetized.

It appears that the increase in sensitivity is achieved at the expense of a lowering of the mean flux density. If this is of concern for effective modulation of the particular magnetoresistor being used, the mean flux density can be increased to the desired level with little effect on the sensitivity by increasing the thickness of the magnet and/or the magnet type, thereby maintaining the desired planarity of the sensor and avoiding the need for a flux guide to improve flux density. However, in special instances where neither of these expedients is adequate, a flux guide may be induced to improve the flux density involving teeth further along the exciter.

Figure 5:
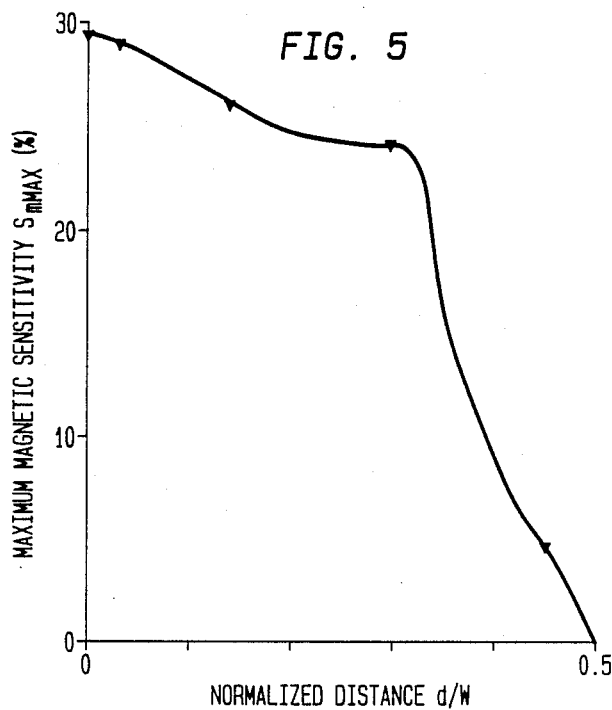
FIGS. 5 and 6 are plots useful in discussing design considerations of the invention.

In order to translate optimally the high magnetic sensitivity of the magnetic circuit described into high electrical sensitivity, the sensing element needs to be appropriately positioned on the magnet. FIG. 5 shows a typical envelope of maximum attainable sensitivity plotted against the normalized distance d/W of the sensing element where d is the distance from the midpoint of the magnet of width W. It can be seen that the peak attainable sensitivity is at the midpoint of the magnet (d=0) and at a minimum at each end of the magnet (d/W=0.5). Accordingly, the optimum location of the sensing element is at the midpoint of the magnet.

It is also important to have a proper width for the sensing element, particularly when the element is a magnetoresistor that produces an electrical output signal corresponding to the average of the flux density across its surface.

Figure 6:
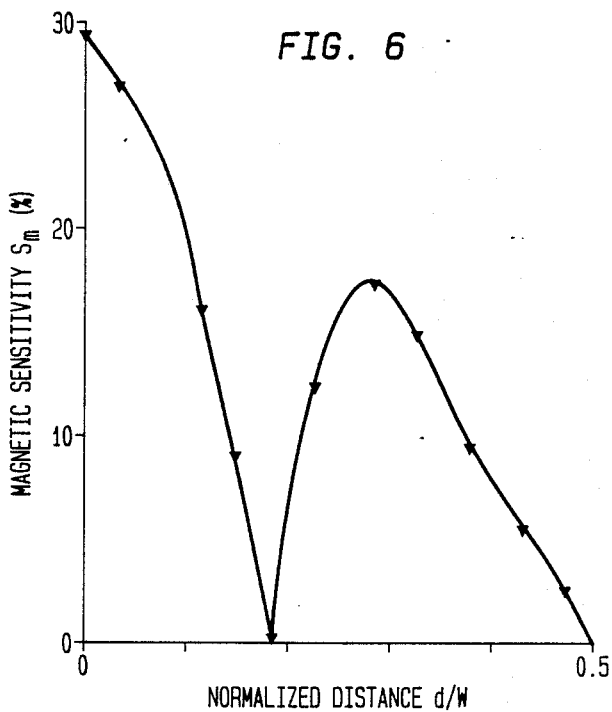

The flux density distribution along the length of the magnetoresistor, however, can be assumed to be constant. Thus, one is required to consider the flux density or sensitivity distributions only along the magnetoresistor width. Because of that, the effective electrical sensitivity will be directly related to the average magnetic sensitivity as determined by integrating the magnetic sensitivity distribution given in FIG. 6 over the magnetoresistor width WMR. FIG. 6 shows how the sensitivity varies along the magnet width for the alignment shown in FIGS. 4A and 4B. Looking at the sensitivity distribution, one would tend to maximize the electrical sensitivity by attempting to make WMR as small as possible. Small size, however, would lower the resistance and power dissipation capability of the magnetoresistor, and in turn lead to a lower output signal. The selection of WMR has to be a compromise which takes into account several conflicting requirements such as the practical limitations on the magnetoresistor length, the best possible sensitivity, sufficiently large resistance and power dissipation, the lowest possible magnetoresistor cost (smaller magnetoresistors are generally less expensive), etc. Considering available magnetoresistor technology, the minimum practical value of WMR for the exciter design that has been discussed presently appears to be about 0.3 mm which amounts to d/W=0.033 and yields an effective magnetic sensitivity SM of about 28 percent. A 0.6 mm width would still provide sensitivity of about 26 percent. The width WMR in any case desirably should be less than the width of the teeth in the usual design. The height of the sensing element may be small, typically tens of microns, whereby the planarity of the associated surface is little disturbed by its presence.

It is also found in our design that the ratio of tooth width T to tooth pitch P also affects sensitivity. It has been found that the sensitivity tends to be maximum for T/P ratios of about 0.25 but to remain relatively flat over the range between 0.17 and 0.37.

It is also found in our design that the tooth pitch affects sensitivity and in particular that increasing the tooth pitch can appreciably increase the sensitivity. For example, for the design discussed, a change in pitch from 3 mm to 5 mm can increase the maximum sensitivity to about 58 percent when conditions are optimized. Since sensitivity decreases with increasing air gap size between the exciter and the magnet, increasing the tooth pitch offers a way to compensate for larger air gap sizes and offers a designer an ability to trade off between air gap width and tooth pitch.

In addition, it is found that the stationary portion of a sensor of the kind described can be used effectively with a broad range of exciter wheel tooth pitch sizes. This feature offers a considerable cost saving potential, for example, for applications such as ABS designs that employ widely differing tooth pitch sizes. If a sensor of a particular stationary design is intended to operate with wheels having different tooth pitch sizes, the magnet width preferably should be chosen to optimize the sensor for the smallest tooth pitch size so that the lowest sensitivity, encountered when using the exciter wheel of smallest tooth pitch size, will be as high as possible. As previously discussed, the optimum magnet width is about 1.5 times the tooth pitch size.

It is to be understood that the specific embodiments described are merely illustrative of the general principles of the invention and various modifications may be devised without departing from the spirit and scope of the invention. For example, it is feasible to reverse the roles of the stationary portion and the moveable portion of the position sensor. Additionally, the various dimensions and materials mentioned are merely illustrative of a typical design and other designs could necessitate other dimensions and materials.

The embodiments of the invention in which an exclusive property or privilege is claimed are defined as follows:

1. A position sensor comprising:
    a stationary portion and an exciter portion adapted to move past said stationary portion;
    said stationary portion including a permanent magnet having a planar major surface normal to the polarization of the magnet, a ferromagnetic layer overlying said major surface, and a sensing element centered along the width of said surface over said layer, the width of said sensing element being substantially less than the width of said magnet; said exciter portion including a succession of teeth spaced apart by gaps that effectively define a tooth pitch, the width of each of said teeth being less than the width of each of said gaps and more than the width of said sensing element; and the width of said magnet being approximately one and one half times the tooth pitch of the exciter portion.

2. The position sensor of claim 1 in which the ferromagnetic layer is coextensive with said one surface of the permanent magnet.

3. A position sensor comprising:
    a stationary portion and an exciter portion adapted to move past said stationary portion;
    said stationary portion including a permanent magnet having a planar major surface normal to the polarization of the magnet, a ferromagnetic layer overlying said major surface, and a sensing element centered along the width of said surface over said layer, the width of said sensing element being substantially less than the width of said magnet; and
    said exciter portion including a succession of teeth spaced apart by gaps that define a tooth pitch, the width of each of said teeth being between about 0.17 and 0.37 the tooth pitch and more than the width of said sensing element.

4. A high sensitivity magnetic sensing circuit that comprises:
    a magnetically permeable exciter portion having a surface that includes a series of aligned raised areas that can be considered as teeth spaced apart by gaps that define a tooth pitch; and
    a sensing portion disposed close to said exciter portion for measuring relative disposition, including relative movement, of said raised areas on said exciter portion with respect to said sensing portion;
    said sensing portion being characterized in that it includes,
    a permanent magnet having a width in the direction of said relative movement that is about the sum of one of said gaps and a whole number multiple of said pitch on said exciter portion in the direction of said relative movement, and
    said magnet supporting a centrally disposed magnetically sensitive narrow electrical element on a surface facing said exciter portion, with said narrow electrical element having a width in the direction of relative movement that is significantly narrower than the width of an exciter tooth,
    effective to provide flux density variations that travel along the width of the magnet in the direction of said relative movement, which flux density variations can be sensed by said magnetically sensitive narrow element.

5. The magnetic circuit of claim 4 in which the raised areas on the exciter are teeth having a given width in the direction of relative movement, the gaps on the exciter are about twice said given tooth width in the direction of relative movement, and the magnet width whole number multiple of pitch is one.

6. The position sensor of claim 4 in which the width of said magnet is approximately one and one half times the tooth pitch of the exciter portion.

7. The position sensor of claim 6 in which the tooth width is between about 0.17 and 0.37 the tooth pitch.

8. The position sensor of claim 6 in which the tooth width is 0.25 the tooth pitch.

9. A high sensitivity magnetic sensing circuit that comprises:
    a rotatable magnetically permeable exciter portion having a generally circular surface that includes a series of teeth separated by slots that define a tooth pitch; and
    a sensing portion disposed close to said exciter portion for measuring relative disposition, including rotational speed, of said teeth on said exciter portion with respect to said sensing portion;

said sensing portion being characterized in that it includes, a permanent magnet having a width in the direction of said rotation that is about the sum of one of said slots and a whole number multiple of said pitch in the direction of said rotation, and said magnet supporting a centrally disposed narrow magnetically sensitive electrical element on a surface facing said exciter portion, with said narrow electrical element having a width in the direction of said rotation that is significantly narrower than the width of an exciter tooth and as narrow as is convenient, whereby said rotation between said exciter portion and said sensing portion produces a localized increase in flux density traveling along the width of the magnet in the direction of said rotation that corresponds to an exciter tooth and that can be sensed by said narrow magnetically sensitive electrical element.

10. The magnetic circuit of claim 9 in which the exciter is a rotatable soft iron member.

11. A high sensitivity magnetic sensing circuit that comprises:

a magnetically permeable exciter portion including a series of raised tooth-like areas spaced apart by gaps which effectively define a tooth width and tooth pitch; and a sensing portion disposed close to said exciter portion for measuring relative disposition, including relative movement, of said raised tooth-like areas on said exciter portion with respect to said sensing portion;

said sensing portion being characterized in that it includes, a permanent magnet having a width in the direction of said relative movement that is about the sum of one of said gaps and a whole number multiple of said pitch on the exciter portion in the direction of said relative movement, a magnetic flux concentrator layer on said magnet having a substantially smooth surface facing said exciter portion, a magnetically sensitive electrical element insulatingly supported on said magnetic flux concentrator layer, said electrical element being centrally disposed on said flux concentrator layer surface facing said exciter portion, said electrical element being characterized in that it has a width in the direction of relative movement that is significantly less than said tooth-like areas and as narrow as is convenient, whereby said relative movement provides sharp local flux density variations traveling along the width of the magnet in the direction of said relative movement corresponding to tooth positions, which variations can be sensed by said narrow sensing element.

12. The magnetic circuit of claim 11 in which said relative movement is rotation, said exciter is a cylinder that is rotatable about its own axis, rotation of said cylinder provides said rotation, said tooth-like areas are on an axial surface of the cylinder, the width of said magnet is approximately the width of one of said tooth-like areas and two of said gaps in the direction of said rotation of said exciter portion, and said flux concentrator layer surface facing the exciter is essentially planar.

13. The magnetic circuit of claim 11 in which the flux concentrator layer surface is an integral part of said magnet.

14. The magnetic circuit of claim 12 in which the flux concentrator layer is an integral part of said magnet.

15. The magnetic circuit of claim 11 in which superposed planar layers comprise the magnet and flux concentrator layers.

16. The position sensor that includes a magnetic circuit that comprises an exciter portion including teeth spaced apart by gaps and a sensing portion for relative movement therebetween, characterized in that the sensing portion includes a permanent magnet having one surface approximate the exciter portion relatively wide compared to the width of an exciter tooth, a layer of high permeability magnetic material over and coextensive with said one surface, and a magnetic sensing element on said layer positioned along a limited portion and substantially centered between the two ends of the permanent magnet, wherein said magnetic sensing element has a width that is less than the width of an exciter tooth, and the width of the permanent magnet is approximately 1.5 times the tooth pitch of the exciter portion.

17. The position sensor of claim 16 in which the tooth width is between about 0.17 and 0.37 the tooth pitch.

18. The position sensor of claim 17 in which the tooth width is about 0.25 the tooth pitch.

* * * * *